Nov. 29, 1927. 1,651,188
E. Z. COLE
LOCK NUT
Original Filed Feb. 1, 1924  2 Sheets-Sheet 1
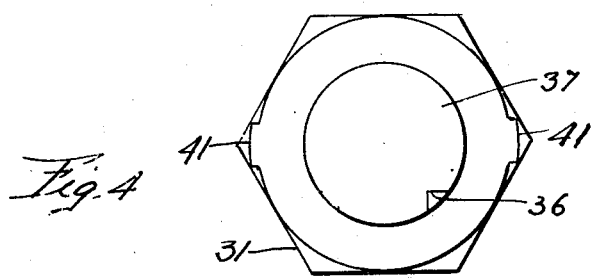
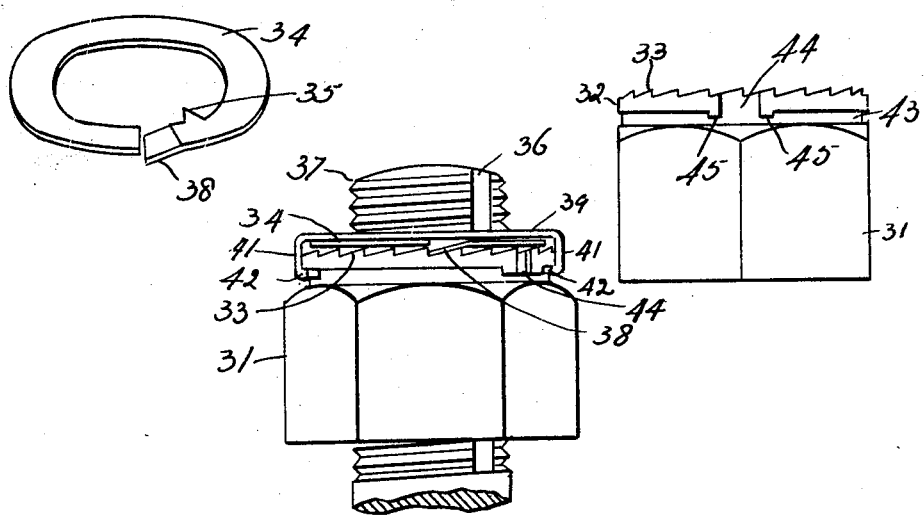
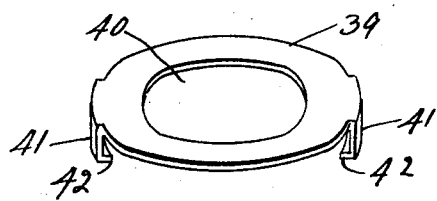
Inventor
Elwyn Z. Cole
By W. W. Williamson
Atty.

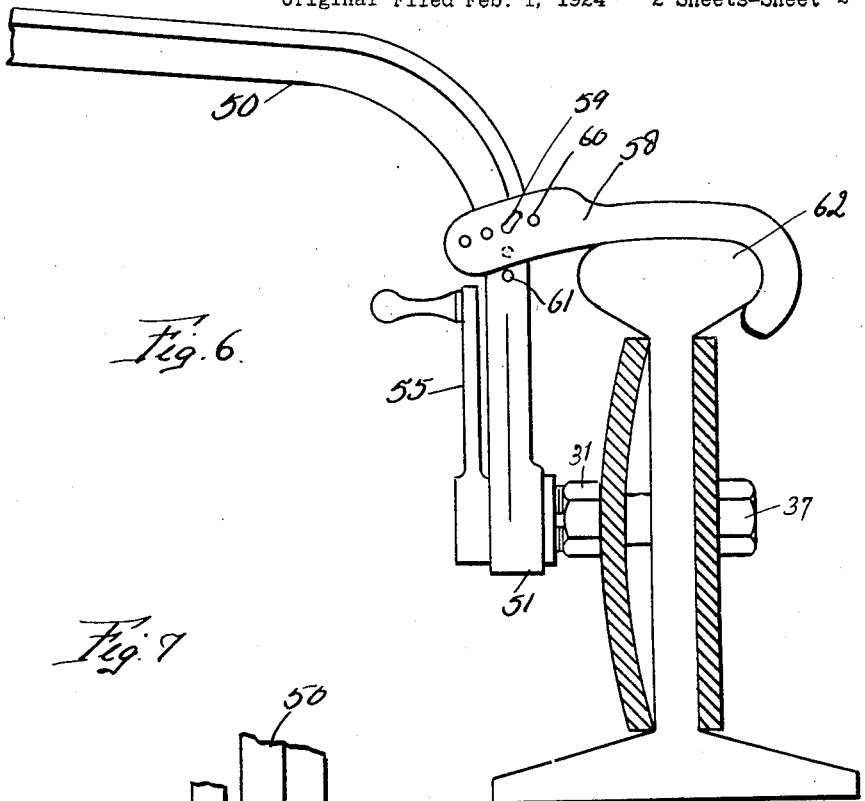

Patented Nov. 29, 1927.

1,651,188

UNITED STATES PATENT OFFICE.

ELWYN Z. COLE, OF PHILADELPHIA, PENNSYLVANIA.

LOCK NUT.

Application filed February 1, 1924, Serial No. 689,840. Renewed September 22, 1927.

My invention relates to a new and useful improvement in lock nuts and a tool for locking and unlocking the same, and has for its object to so modify the construction shown in my former application filed January 23rd, 1924 under Serial Number 688,033, whereby this form of lock nut may be especially adapted for use on railway joints and the like.

A further object of my invention is to so utilize a split spring washer that the latter will be held against rotation by the bolt upon which the nut is threaded and will be locked into compressed position in engagement with teeth carried by the nut so that the nut may be readily set up from time to time as occasion may require but will be prevented from any retrograde movement.

With these and other ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 1, is an end view of a nut and bolt having my improvements applied thereto.

Fig. 2 is a side elevation of Fig. 1.

Fig. 3, is a detail side elevation of the nut showing the bayonet locking slot therein.

Fig. 4, is a detail perspective of the split washer.

Fig. 5, is a detail perspective of the retaining cap.

Fig. 6, shows the end of a railway rail the fish plate thereon being in section and illustrates my improved tool for locking and unlocking the locking mechanism of the nut in operative position.

Fig. 7, is an enlarged detail view of the lower portion of the tool shown in Fig. 6 partly broken away and sectioned to clearly show the operating parts thereof and their application to the locking mechanism of the nut.

Fig. 8 is an inner face view of Fig. 7 the nut being removed.

In carrying out my invention as here embodied, 31 represents a nut having a hub 32 formed therewith and this hub has the teeth or serrations 33 formed upon the face thereof, said teeth being preferably in the form of ratchet teeth.

34 represents a locking washer having a spline lug 35 for engagement with a spline groove 36 formed lengthwise of the bolt 37 and this locking washer is in the form of what is generally known as a split washer and has one of the ends thereof so bent or formed as to produce a ratchet 38 for engagement with the teeth 33. This washer is preferably of spring material and when of steel may be hardened and tempered to produce a highly resilient spring action.

39 represents the retaining cap having a hole 40 through the center thereof in order that it may be readily passed over the end of the bolt and this cap carries the arms 41 the latter terminating in the lugs or shoes 42 for the purpose hereinafter set forth.

Around the periphery of the hub is formed a groove 43 to which leads the passageways 44, there preferably being two of these passageways diametrically opposite each other, and where each of the passageways enter the groove 43 I provide the offsets or shoulders 45. This construction provides for the passage of the shoes 42 through the passageways 44 into the groove 43 so that by turning the retaining cap 39 upon its axis the shoes will be carried passed the offsets 45 and when drawn backward will lie behind these offsets so as to prevent accidental displacement of the cap as will be readily understood.

In practice the nut may be threaded upon the bolt and before said nut has been jambed against the part intended to be held in place the split washer is set over the nut the lug 35 sliding in the spline groove 36 and thereafter the retaining cap 39 is applied to the nut as above described and which in so doing will compress the washer 34 firmly holding the ratchet 38 into engagement with the teeth 33 while at the same time forcing the cap outward so as to firmly retain the shoes 42 against the outer face of the groove 43 thus preventing any accidental displacement of the cap by said shoes being prevented from passing the offsets 45.

In certain classes of work such as the securement of the fish plates upon railway rails it is highly essential that not only should the nuts be locked upon the bolts but that the unlocking of such nuts should be comparatively difficult or practically impossible to unauthorized persons and yet of ready accomplishment by authorized persons. This result is accomplished in my invention by making the split washer of sufficient spring strength to preclude its being compressed by the hand or any ordinary tool but requiring a special tool for accomplishing this result and such a special tool I have shown in Figs. 6 to 8 inclusive in which 50 represents a lever having its inner end bent at substantially right angles and terminating in a head 51 in which is journalled the shank 52 of the chuck 53, a ball bearing 54 being preferably provided to reduce the friction incident to the turning of the chuck under pressure.

55 represents a crank handle which is secured upon the outer end of the shank 52 so that when this crank handle is turned the chuck will be revolved.

In the inner face of the chuck 53 is formed the socket 56 adapted to fit over the retaining cap 39 and this socket has the grooves 57 formed therein which latter are adapted to fit over the arms 41 of the cap 39.

58 represents a hook which is adjustably pivoted to the lever 50 by means of a pin 59 adapted to pass through any one of a number of holes 60 in the hook and in one of a number of holes 61 in the lever and this hook is adapted to engage with the head 62 of an ordinary railway rail, as clearly shown in Fig. 6, and when so engaged the chuck 53 may be applied to the retaining cap 39 as before described and when so applied pressure upon the lever 50 such as the operator sitting thereon will compress the split spring washer 34 sufficiently to permit the shoes 42 being moved past the offsets 45 into alignment with the passageways 44 and this is readily accomplished by the turning of the crank handle 55 when the spring washer is so compressed. When the shoes have been turned into alignment with the passageways the releasing of the pressure from the lever will permit the shoes to be forced outward through the passageways by the action of the split washer when by the removal of the chuck from the cap the latter may be withdrawn also permitting the withdrawal of the split washer thus freeing the nut so that it may be readily backed off. The replacing of the locking mechanism is accomplished by the application of the chuck to the retaining cap the applying of sufficient pressure through the lever to compress the split washer and force the shoes beyond the offsets when by turning the crank these shoes will be carried to one side of said offset so that when the pressure of the lever is released said shoes will be seated behind the offsets thus precluding the possibility of accidental displacement.

Of course I do not wish to be limited to the exact details of construction as herein shown as these may be varied within the limits of the appended claims without departing from the spirit of my invention.

Having thus fully described my invention, what I claim as new and useful is:—

1. A lock nut comprising a nut, a hub carried by said nut, teeth formed upon the face of the hub, a groove formed around the periphery of the hub, passageways leading to said groove, offsets formed in the groove adjacent the passageways, a split spring washer splined to the bolt upon which the nut is threaded, a ratchet tooth formed with said washer adapted to engage the teeth formed upon the face of the hub, and a retaining cap carrying shoes adapted to pass through the passageways and be turned into the groove back of said offsets whereby the split washer will be locked in position against accidental displacement.

2. In a device of the character described, a bolt having a spline lengthwise therein, a nut adapted to thread upon said bolt, a hub carried by the nut, said hub having teeth formed upon the face thereof, a split spring washer splined to the bolt and having a ratchet tooth formed therewith for engagement with the first named teeth, and a retaining cap adapted to be locked upon the hub for holding the split spring washer in place.

In testimony whereof, I have hereunto affixed my signature.

ELWYN Z. COLE.